Patented July 3, 1934

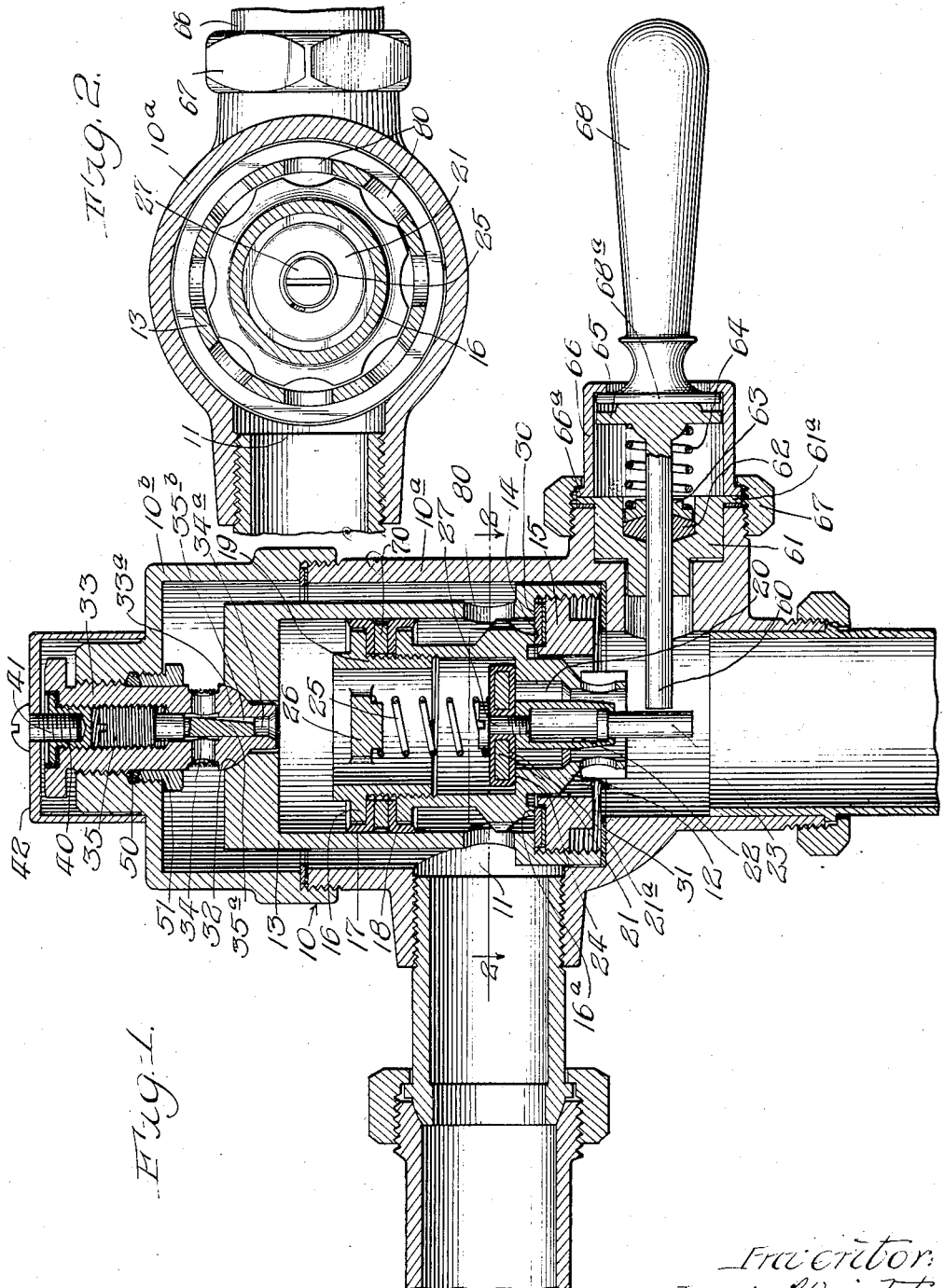

1,965,328

UNITED STATES PATENT OFFICE 1,965,328

VALVE

Leo Lewis Wright, Indianapolis, Ind., assignor to Chicago Faucet Company, a corporation of Illinois Application July 29, 1933, Serial No. 682,865

5 Claims. (Cl. 137—93)

This invention relates to improvements in valves and more particularly in special flush valves of the type that are commonly used for flushing water closets, sinks and the like.

Among the features of my invention is the provision of a flushing valve employing a cylinder and piston, in which the cylinder, with its valve seat and piston, can be readily removed from the casing as a unit. In valves of this character, the seat in the cylinder, the piston, or other parts may require replacement, adjustment or repair. By the use of my invention, such operations are greatly facilitated by the ability to remove the entire cylinder assembly as a unit.

Another feature of my invention is the making of the piston, with its valve as a separate unit, readily removable from the cylinder.

Another feature is the provision of a set screw and by-pass assembly in a unit construction, the details of which will be more particularly referred to hereinafter.

Another feature of my invention is the provision of a flush valve that is simple and efficient in construction and operation and a valve which will operate for a long period with a minimum amount of care or maintenance.

Other features and advantages will appear more fully as I proceed with my specification.

In that form of device embodying the features of my invention shown in the accompanying drawing, Figure 1 is a vertical sectional view and Fig. 2 is a view taken as indicated by the line 2 of Fig. 1.

As shown in the drawing, the valve includes a cylindrical casing indicated in general by 10 and is shown as formed of the main body portion 10$^a$ with a removable cap 10$^b$. 11 indicates the inlet to the casing at one side and 12 the outlet at the bottom.

Inside of the casing is a cylinder or barrel 13 with an inner valve seat 14 (here shown as a rubber gasket), said valve seat being removable by removal of the valve seat ring 15. The seat 14 is held in position in the lower end of the cylinder by the ring 15 which holds the seat 14 against the shoulder 30.

16 indicates a piston in the cylinder 13 provided with the usual cup washers 17 and 18. As here shown, these cup washers are held in position by the removable sleeve or collar 19 threaded into the upper end of the piston.

The piston 16 has a central opening 20 at the bottom which is closed by a check valve 21 provided with a depending hollow stem 22 in which is slidably mounted the extension tail piece 23. The check valve 21 seats on a seat 24 on the inside of the piston and is yieldingly held on the seat by the spiral spring 25, the upper end of which engages a cross bar 26 in the upper end of the piston.

As here shown, the disc part of the check valve in the piston is covered with rubber or other suitable material 21$^a$ and this part is fastened to the stem 22 by the screw 27.

The entire cylinder assembly is removable as a unit from the casing 10 by removing the cap 10$^b$. When the cap is in position, the cylinder assembly is held on the gasket 31 at the bottom of the casing by the following described means. The upper end 13$^a$ of the cylinder 13 is provided with a spherical recess 32 in which is seated the lower, rounded end 33$^a$ of the screw 33 threaded in the cap 10$^b$. In assembling the device, the cylinder assembly is placed in the casing, the screw 33 retracted and the cap 10$^b$ then put in place. The screw 33 is then tightened down through the cap until the cylinder 13 is pressed firmly on the gasket 31 in the bottom of the casing.

The screw 33 is provided with ports 34 communicating with an adjustable by-pass or bleed controlling passage of liquid from the interior of the casing 10 into the upper end of the cylinder 13. This adjustable by-pass or bleed is accomplished by providing the screw 35 threaded into a central aperture through the screw 33. The lower end of the screw 35 is provided with an extension 35$^a$ carrying a tapered groove 35$^b$. The central aperture in the screw 35 communicates with the ports 34 and its lower end, as indicated by 34$^a$, communicates with the interior of the cylinder 13. This central aperture below the ports 34 is more or less closed by the extension 35$^a$ on the screw 35 depending upon the position of this screw. It will be seen that adjusting this screw upwardly will increase the opening and downwardly will decrease it. After the screw 35 has been properly adjusted, the screw 40 is put in place in the upper end of the screw 33 to entirely close the upper end of the central aperture. This screw 40 may also receive a screw 41 which holds in position a protective cap 42. By removing the cap and the screw 40, access may be had to the screw 35 to adjust the size of the by-pass or bleed which permits flow of liquid from the interior of the casing 10 to the interior of the cylinder 13 above the piston 16.

There is also provided means for making a tight joint between the screw 33 and the casing. This includes the packing 50 and gland 51.

Means are also provided for unseating the check valve 21 in the piston to initiate operation of the valve. This means is also removable as a unit from the device. It includes the rod 60 adapted to be pressed against the tail piece 23. This rod is slidably mounted in a collar 61 and packed therein by suitable packing 62 held by the gland 63 which is pressed against the packing by the spring 64. The outer end of the spring also serves to bear against the disc 65 on the outer end of the rod 60 so that this rod is yieldingly held in its outer position. 66 indicates a casing with a flange 66$^a$ held by the union nut 67, said nut also clamping the flange 61$^a$ on the member 61. 68 indicates a handle with a flange 68$^a$ locked under the rim of the casing 66. With the parts in position as shown, it will be seen that rocking of the handle 68 will cause the flange 68$^a$ to press the disc 65 inwardly. This will press in the rod 60 against the tail piece 23 and rock the check valve 21 sufficiently to unseat it. Removal of the nut 67 will permit easy and quick removal of the member 61 with its associated parts and entire handle assembly. It will be seen also that the spring 64 serves a dual function of holding the packing 62 in position and also urging the rod 60 outwardly.

It will be seen also that the entire set screw and by-pass assembly is removable as a unit. That is, removal of the screw 33 will bring with it the screw 35 which adjusts the by-pass.

The piston assembly with its check valve is also removable as a unit from the cylinder 13 by removing the member 15. The check valve 21 is easily removable from the piston through the top by removing the member 19 which also releases the cup washers 17 and 18 and the spacing washer 70.

80 indicates ports in the cylinder 13 below the piston 16. The piston carries the valve 16$^a$ which seats on the valve seat 14. In the operation of the device, the water pressure above and below the piston 16 is the same and the check valve 21 is closed. Consequently, the valve 16$^a$ is held down on the seat 14. When the handle 68 is moved, the rod 60 is pushed in against the tail piece 23 on the check valve 21 to unseat it. This allows water to flow from the inside of the cylinder 13 above the piston down through the piston, thus relieving the pressure on top of the piston inside of the cylinder. Water entering through the ports 80 therefore moves the piston upwardly to lift the valve 16$^a$ from the seat 14 and there results a full flow of water through the ports 80 through the ring 15 and into the outlet 12. Meanwhile, the check valve 21 has seated on the seat 24 by the spring 25. Also, water will commence to flow slowly through the by-pass or bleed depending upon the adjustment of the screw 35 into the upper end of the cylinder 13 above the piston. Consequently, the piston will be slowly forced down again until the valve 16$^a$ seats on the seat 14 and stops further flow of water.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

It is to be noted further that in a valve made in accordance with my invention, there is no wear on the casing. All parts subject to wear are incorporated in units which are readily removable from the casing.

What I regard as new, and desire to secure by Letters Patent, is:

1. A flush valve of the character described, including; a casing with an inlet and an outlet, and provided with a removable cap; a cylinder in the casing with one end open, said end covering said outlet and provided with an inner valve seat; a vertically adjustable screw in the cap of the casing for holding said cylinder in position in the casing; a piston in the cylinder, said piston carrying a valve seating in the valve seat in the cylinder; a port in the cylinder below the piston; a by-pass in the cylinder above the piston; a check valve in the piston; and means for unseating the check valve in the piston.

2. A flush valve of the character described, including; a casing with an inlet and an outlet, and provided with a removable cap; a cylinder in the casing with one end open, said end covering said outlet and provided with an inner valve seat; a screw in the cap adapted to be screwed down against the upper end of the cylinder to hold the same in position in the casing, said screw being provided with an adjustable communication leading from the upper end of the cylinder to the interior of the casing; a piston in the cylinder, said piston carrying a valve seating on the valve seat in the cylinder; a port in the cylinder below the piston; a check valve in the piston; and means for unseating the check valve in the piston.

3. Apparatus as claimed in claim 2 in which the by-pass in the screw in the cap of the casing is adjustable from the outside of said cap.

4. Apparatus as claimed in claim 2 in which the screw in the cap of the casing is provided with a central aperture and a screw threaded therein, said screw being provided with an extension having a tapered portion whereby the effective area of said aperture can be adjusted by movement of said screw.

5. A flush valve of the character described including; a casing with an inlet and an outlet, and provided with a removable cap; a cylinder in the casing with one end open, said end covering said outlet and provided with an inner valve seat; a screw in the cap of the casing adapted to be screwed down against the upper end of the cylinder to hold the same in position in the casing, said screw being provided with a communication leading from the interior of the cylinder to the interior of the casing and means for adjusting the effective size of said communication, said screw and adjusting means being removable as a unit from the cap of the casing; a piston in the cylinder, said piston carrying a valve seating on the valve seat in the cylinder; a port in the cylinder below the piston; a check valve in the cylinder; and means for unseating the check valve in the piston.

LEO LEWIS WRIGHT.